United States Patent
Krishnamachari et al.

(10) Patent No.: US 9,559,752 B1
(45) Date of Patent: Jan. 31, 2017

(54) SWITCHING SIGNAL POLARITY OF A NETWORK DEVICE PLUG FOR USE IN A POWERLINE COMMUNICATION NETWORK

(71) Applicant: QUALCOMM Incorporated, San Diego, CA (US)

(72) Inventors: Anand Krishnamachari, San Jose, CA (US); Manjunath Anandarama Krishnam, San Jose, CA (US); Syed Adil Hussain, Cupertino, CA (US); Purva Rameshchandra Rajkotia, Orlando, FL (US); Hassan Kaywan Afkhami, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/864,051

(22) Filed: Sep. 24, 2015

(51) Int. Cl.
H04B 3/54 (2006.01)
H04L 5/00 (2006.01)
H04B 7/04 (2006.01)

(52) U.S. Cl.
CPC ............ H04B 3/542 (2013.01); H04B 7/0413 (2013.01); H04L 5/006 (2013.01); H04B 3/54 (2013.01)

(58) Field of Classification Search
CPC .............. H04B 3/54; H04B 2203/5454; H04B 2203/5483; H04B 3/542; H04L 25/026
See application file for complete search history.

(56) References Cited

U.S. PATENT DOCUMENTS

| 8,160,162 | B2 | 4/2012 | Stadelmeier et al. | |
| 8,879,644 | B2 | 11/2014 | Reuven et al. | |
| 8,902,957 | B2 | 12/2014 | Schneider et al. | |
| 2013/0095702 | A1* | 4/2013 | Golko | H01R 13/6273 439/676 |
| 2013/0244497 | A1* | 9/2013 | Zhang | H01R 13/64 439/676 |
| 2013/0267120 | A1* | 10/2013 | Rothkopf | H01R 13/64 439/620.21 |
| 2014/0004741 | A1* | 1/2014 | Jol | H01R 29/00 439/620.01 |
| 2014/0269952 | A1 | 9/2014 | Katar et al. | |
| 2014/0277643 | A1* | 9/2014 | Villarreal | G06F 17/3074 700/94 |
| 2014/0355697 | A1 | 12/2014 | Magin et al. | |
| 2015/0070832 | A1* | 3/2015 | Schneider | G06F 1/1632 361/679.41 |
| 2015/0072557 | A1* | 3/2015 | Kamei | H01R 24/60 439/607.02 |
| 2015/0333714 | A1* | 11/2015 | Chiu | H03F 3/45179 330/261 |
| 2016/0110305 | A1* | 4/2016 | Hundal | G06F 13/4022 710/316 |

* cited by examiner

Primary Examiner — Jean B Corrielus
(74) Attorney, Agent, or Firm — DeLizio Law, PLLC

(57) ABSTRACT

A network device may include a plug that couples with a socket to couple the network device to a PLC network. A position of the plug may be interchanged when the plug is coupled with the socket. In one example, the network device may determine a coupling orientation of the plug that indicates the position of the plug with respect to the socket. The plug includes a first plug terminal, a second plug terminal, a first ground plug terminal, and a second ground plug terminal. The network device may select a signal polarity for the plug based, at least in part, on the coupling orientation. The signal polarity indicates over which of the plug terminals data is to be transmitted for communication over the PLC network.

27 Claims, 7 Drawing Sheets

SWITCHING SIGNAL POLARITY OF A NETWORK DEVICE PLUG FOR USE IN A POWERLINE COMMUNICATION NETWORK

BACKGROUND

Embodiments of the subject matter described herein generally relate to the field of communications, and, more particularly, to switching polarity of a network device plug used in a powerline communication network.

Some network devices may communicate data over powerline communication networks. For example, a powerline communication (PLC) network carries data on PLC network conductors that are also used for alternating current (AC) power. A network device may include a plug that couples with a socket that is connected to the PLC network. The plug includes at least two plug terminals, a first plug terminal and a second plug terminal. The first plug terminal is coupled to a first plug connection of the network device. The second plug terminal is coupled to a second plug connection of the network device.

The socket also includes at least two terminals. When the plug is coupled with the socket, the first and second plug terminals each couple with line and neutral terminal of the socket. Some sockets and plugs may include three, four, or more separate terminals, including a protective earth (also referred to as ground) terminal. Some plugs may be capable of coupling with sockets in different coupling orientations. In a first coupling orientation, the first plug terminal may be coupled with the line socket terminal, and the second plug terminal may be coupled with the neutral socket terminal. However, in a second coupling orientation, the first plug terminal may instead be coupled with the neutral socket terminal, and the second plug terminal may instead be coupled with the line socket terminal. This results in interchanged first and second plug connections. Communication issues may arise when data is transmitted over the interchanged first and second plug connections.

SUMMARY

A network device may include a plug that couples with a socket to connect the network device to a PLC network. A position of the plug when the plug is coupled with the socket may be referred to as coupling orientation. In one example, the network device may determine a coupling orientation of the plug. In one embodiment, the plug includes a first plug terminal, a second plug terminal, a first ground plug terminal, and a second ground plug terminal. The network device may select a signal polarity for the plug based, at least in part, on the coupling orientation. If the network device determines a change in the coupling orientation of the plug, the network device can switch the signal polarity.

BRIEF DESCRIPTION OF THE DRAWINGS

The present embodiments may be better understood, and numerous objects and features made apparent to those skilled in the art by referencing the accompanying drawings.

DESCRIPTION OF EMBODIMENT(S)

Figure 1:
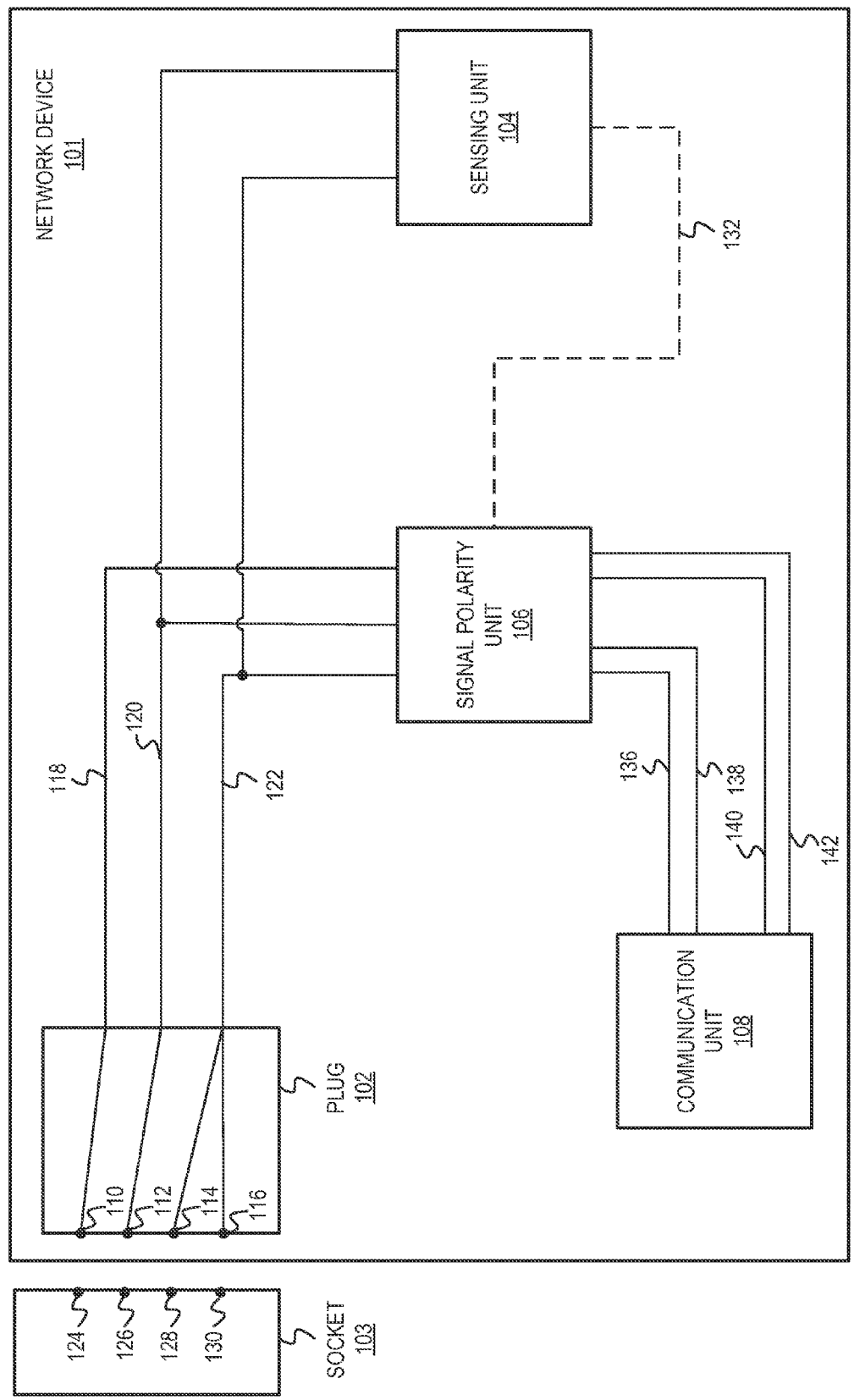
FIG. 1 is a diagram of a network device including a plug whose signal polarity may be switched, in accordance with some embodiments of the disclosure.

The description that follows includes exemplary systems, devices, methods, techniques, instruction sequences and computer program products that embody techniques of this disclosure. However, it is understood that the described embodiments may be practiced without these specific details. Although some examples refer to operating in PLC networks, in other embodiments, the operations described herein may be performed to operate in other network types. In other instances, well-known instruction instances, protocols, structures and techniques have not been shown in detail to avoid obfuscating the description.

A PLC network carries data on PLC network conductors that are also used for alternating current (AC) power. A network device may connect to the PLC network with a plug coupled to socket that is connected to the PLC network. There are many different socket types. For example, the United States of America (US) and Europe each use different socket types, and thus use different plug types.

Network devices often include plugs. In one embodiment, a plug includes four separate terminals, which are a line plug terminal, neutral plug terminal, and two separate protective earth plug terminals (also referred to as ground plug terminals). Each plug terminal may couple with a corresponding socket terminal. Each socket terminal may be coupled to a separate PLC network conductor in the PLC network. As a result, the network device may couple to the PLC network via its plug and the socket. The socket may include four socket terminals, a line socket terminal, a neutral socket terminal, and two ground socket terminals. The two ground socket terminals may be both coupled to the same ground PLC network conductor of the PLC network. Example plugs and sockets that each have four terminals are described below with reference to FIGS. 1 and 3.

The network device may transmit data through the plug to communicate over the PLC network using a PLC communication protocol. In one embodiment, the network device may transmit the data through the plug over the line and neutral PLC network conductors of the PLC network. Where one or more additional PLC network conductors are available, some variations of the PLC communication protocol may use the additional PLC network conductor(s) for communication. For example, a variation of the PLC communication protocol may additionally use the ground PLC network conductor(s) for communication using differential transmission techniques. The network device may communicate using the differential transmission techniques over the three PLC network conductors of the PLC network (i.e., over the line PLC network conductor, the neutral PLC network conductor, and the ground PLC network conductor). The differential transmission techniques include multipath signaling which may include a multiple-input multiple-output (MIMO) technique. For example, the network device may communicate over a line and neutral (L-N) pair of PLC network conductors and over a line and ground (L-G) pair of PLC network conductors. In one embodiment, the network device communicates according to the PLC communication protocol with the MIMO technique that uses the L-N and L-G pairs of PLC network conductors.

In one embodiment, a network device's plug can couple with a socket in different coupling orientations. When the coupling orientation changes (e.g., rotates), couplings between the plug and socket terminals may be interchanged. Signal polarity is a communication state of the plug that is based on which of each of the plug terminals is coupled to each of the socket terminals. Signal polarity can be used to affect which of the plug terminals to use for transmitting data intended for the different PLC network conductors during powerline communication. For example, in one coupling orientation, a plug's first plug terminal may be coupled with a line socket terminal, and the plug's second plug terminal may be couple with a neutral socket terminal.

In a different coupling orientation, the terminals may be interchanged. That is, the plug's first plug terminal may be coupled with a neutral socket terminal, and the plug's second plug terminal may be coupled with a line socket terminal. As a result, changing coupling orientations may cause communication problems for the network device. For example, data intended for transmission over the line socket terminal may be inadvertently transmitted over the neutral socket terminal. In other words, when the coupling orientation of the plug is changed, the network device communicates over the N-L pair of PLC network conductors and over the N-G pair of PLC network conductors, instead of over the L-N and L-G pairs of PLC network conductors. Thus, when the coupling orientation of the plug is changed, performance of the communication over the PLC network may suffer.

In some embodiments, the network device determines a coupling orientation of its plug, which indicates a position of the plug with respect to a socket. The network device then determines whether to switch the signal polarity by switching the first and second connections of the network device. For example, the network device may determine to switch the signal polarity after determining that the coupling orientation form an N-L and an N-G pair of conductors instead of an L-N and an L-G pair of conductors. After the signal polarity is switched, the network device communicates over the switched connections, and thus over the L-N and L-G pairs of conductors.

FIG. 1 is a diagram of a network device including a plug whose signal polarity may be switched. In FIG. 1, the network device 101 includes a plug 102, a sensing unit 104, a signal polarity unit 106, and a communication unit 108. The network device 101 couples to a socket 103 via the plug 102. The plug 102 includes four terminals, a first plug terminal 110, a second plug terminal 112, a first ground plug terminal 114, and a second ground plug terminal 116. A first plug connection 118 is coupled to the first plug terminal 110. A second plug connection 120 is coupled to the second plug terminal 112. A ground plug connection 122 is coupled to both of the first ground plug terminal 114 and the second ground plug terminal 116. The plug 102 may be coupled with the socket 103 in different coupling orientations.

In a first coupling orientation, the plug 102 couples with the socket 103 to couple the first plug terminal 110 with a line socket terminal 124, the second plug terminal 112 with a neutral socket terminal 126, a first ground plug terminal 114 with a first ground socket terminal 128, and the second ground plug terminal 116 with a second ground socket terminal 130. In a second coupling orientation, the plug 102 couples with the socket 103 to couple the first plug terminal 110 with the neutral socket terminal 126, the second plug terminal 112 with the line socket terminal 124, the first ground plug terminal 114 with the second ground socket terminal 130, and the second ground plug terminal 116 with the first ground socket terminal 128. Thus, the first plug connection 118 and the second plug connection 120 may be interchanged based on the coupling orientations relative to the socket 103. Because the first ground plug terminal 114 and the second ground plug terminal 116 are coupled to the same ground plug connection 122 of the network device, the coupling orientation of the plug 102 does not affect the ground plug connection 122.

Regardless of the coupling orientation of the plug 102, the socket 103 is coupled with three PLC network conductors of the PLC network. The line socket terminal 124 couples with a line PLC network conductor (not shown), the neutral socket terminal 126 couples with a neutral PLC network conductor (not shown), and the first ground socket terminal 128 and the second ground socket terminal 130 couple with a ground PLC network conductor (not shown).

The sensing unit 104 is coupled with the second plug connection 120 and the ground plug connection 122. The sensing unit 104 detects a coupling orientation of the plug 102 with respect to the socket 103. In one embodiment, the sensing unit 104 detects the coupling orientation by detecting a signal between the second plug connection 120 and the ground plug connection 122. The sensing unit 104 may then indicate, e.g., by using an indication 132, the coupling orientation. For example, the sensing unit 104 may indicate that the plug 102 is in the first coupling orientation or in the second coupling orientation. One embodiment of the sensing unit 104 is described below with reference to FIG. 4.

The signal polarity unit 106 is coupled with the first plug connection 118, the second plug connection 120, and the ground plug connection 122. The signal polarity unit 106 also receives the indication 132 from the sensing unit 104. The signal polarity unit 106 may switch the signal polarity based, at least in part, on the indication 132. When the signal polarity unit 106 switches the signal polarity, communication on the first plug connection 118 and the second plug connection 120 are switched. After the switching, communications that would have been sent over the first plug connection 118 are now sent over the second plug connection 120, and vice versa.

The communication unit 108 is coupled to the signal polarity unit 106 using two communication connection pairs. A first communication connection pair includes connection 136 and connection 138. A second communication connection pair includes connection 140 and connection 142. The communication unit 108 may communicate data over the first communication connection pair and over the second communication connection pair using multipath techniques, e.g., using differential transmission techniques. In one embodiment, the communication unit 108 communicates over the first communication connection pair to transmit data intended for the L-N pair of PLC network conductors. The communication unit 108 communicates over the second communication connection pair to transmit data intended for the L-G pair of PLC network conductors.

If the plug 102 is in a first coupling orientation, then the communication unit 108 may communicate data over the first communication connection pair (connection 136 and connection 138) and over the second communication connection pair (connection 140 and connection 142), and communicate over the terminals 110-116 as intended. If the plug 102 is in the second coupling orientation, then the communication unit 108 uses the first and second plug connections with switched signal polarity, as switched by the signal polarity unit 106. The communication unit 108 then communicates over the communication connection pairs using the switched first and second plug connections.

Figure 2:
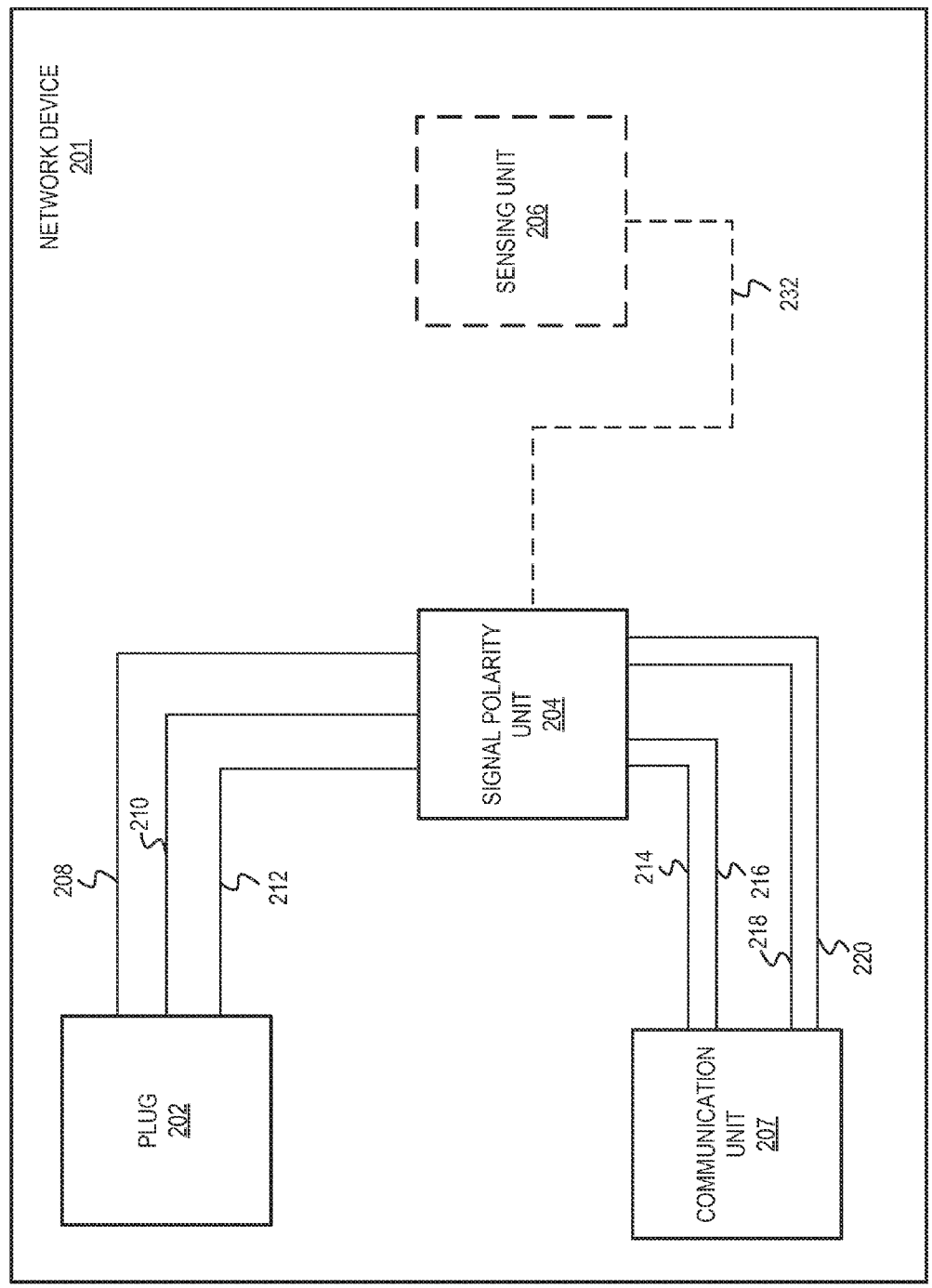
FIG. 2 is a diagram of another example network device including a plug whose signal polarity may be switched.

FIG. 2 is a diagram of an example network device including a plug whose signal polarity may be switched. In FIG. 2, plug 202 of network device 201 includes a first plug connection 208, a second plug connection 210, and a ground plug connection 212. The network device 201 includes a signal polarity unit 204, a sensing unit 206, and a communication unit 207.

The embodiment of FIG. 2 is similar to the embodiment described in FIG. 1. However, the sensing unit 206 is not coupled to any of the connections 208-212. Instead, the sensing unit 206 may determine a coupling orientation of the plug 202 based on accessing communication received and processed by the network device 201. The sensing unit 206 may make this determination based on determining a signal-to-noise ratio (SNR) of signals that carry the communication over the plug 202. The sensing unit 206 may determine whether the SNR level is greater than a SNR threshold. If the SNR level is greater than the SNR threshold, the sensing unit 206 may determine that the plug 202 is in the second coupling orientation. The sensing unit 206 may indicate, e.g., by using an indication 232, the coupling orientation of the plug 202.

Figure 3:
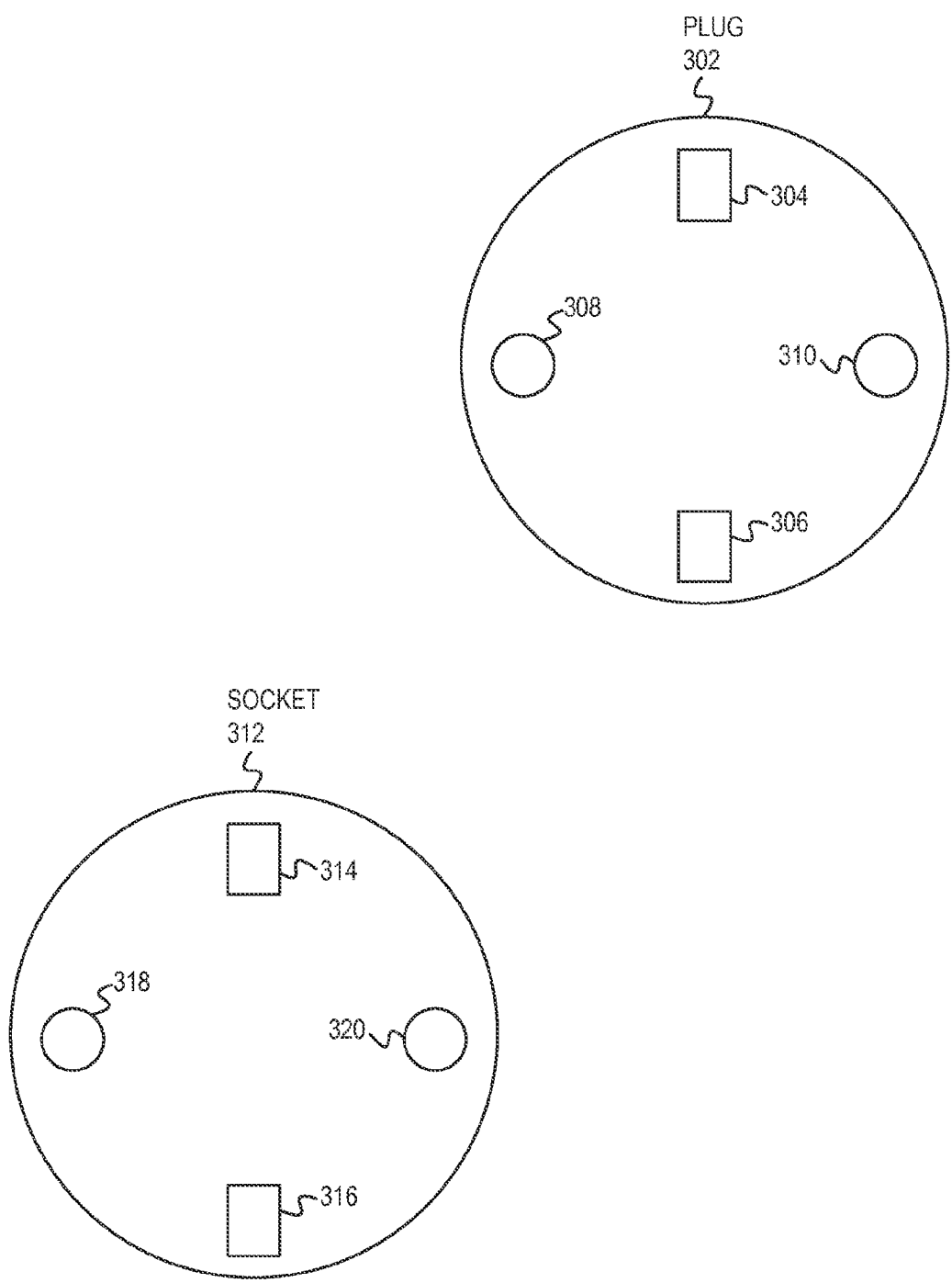
FIG. 3 is a diagram showing a plug of a network device and a socket, in accordance with some embodiment of the disclosure.

FIG. 3 is a diagram showing an example plug of a network device and a socket that couples with the plug. In FIG. 3, the plug 302 includes a first ground plug terminal 304, a second ground plug terminal 306, a first plug terminal 308, and a second plug terminal 310. The socket 312 includes a first ground socket terminal 314, a second ground socket terminal 316, a line socket terminal 318, and a neutral socket terminal 320. The plug 302 may be coupled with the socket 312 in different orientations.

In a first coupling orientation, the plug 302 couples with the socket 312 to couple the first plug terminal 308 with the line socket terminal 318, the second plug terminal 310 with the neutral socket terminal 320, the first ground plug terminal 304 with the first ground socket terminal 314, and the second ground plug terminal 306 with the second ground socket terminal 316. In a second coupling orientation, the plug 302 couples with the socket 312 to couple the first plug terminal 308 with the neutral socket terminal 320, the second plug terminal 310 with the line socket terminal 318, the first ground plug terminal 304 with the second ground socket terminal 316, and the second ground plug terminal 306 with the first ground socket terminal 314.

Figure 4:
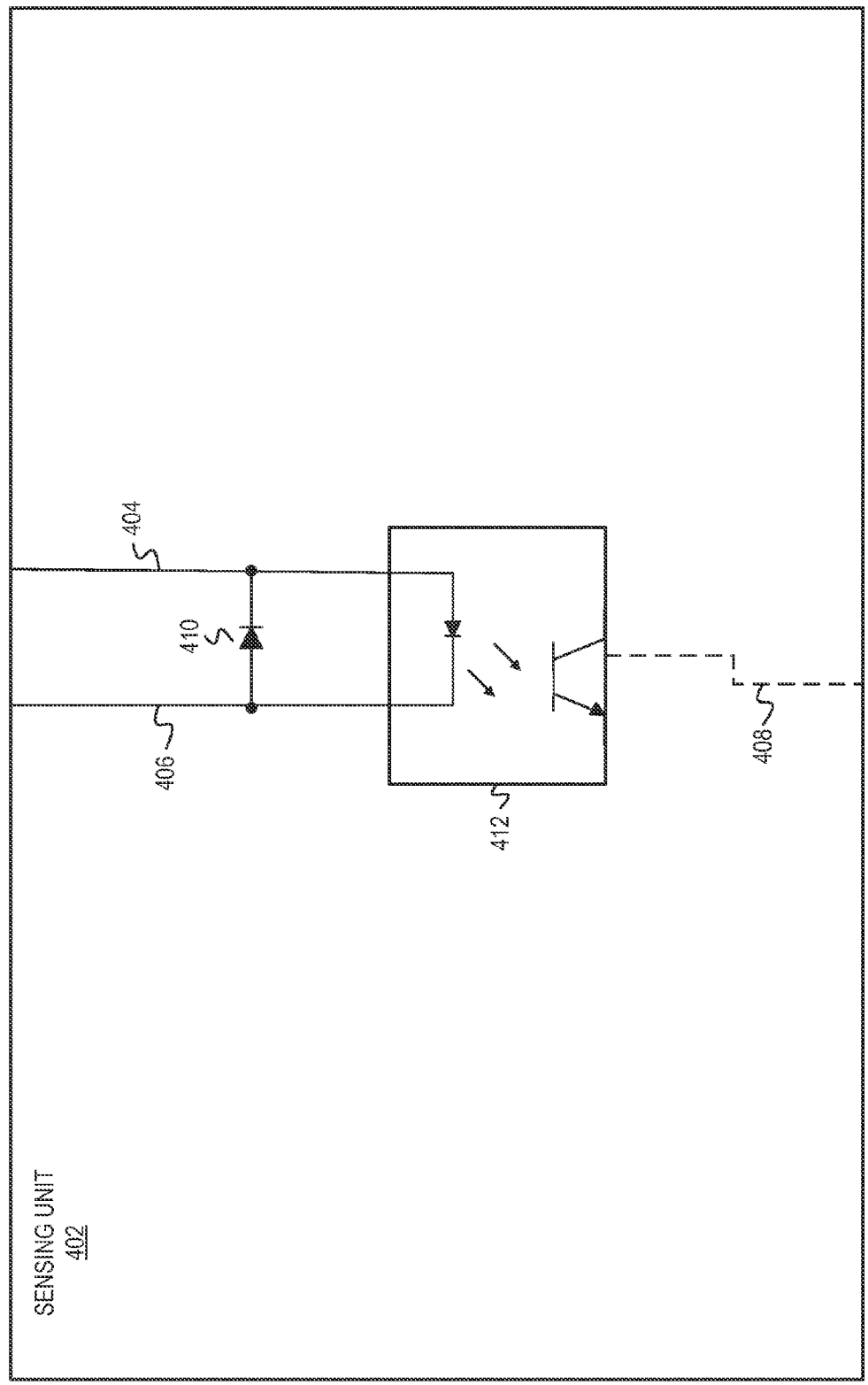
FIG. 4 is a diagram showing an example sensing unit of a network device.

FIG. 4 is a diagram showing an example sensing unit of a network device. In FIG. 4, the sensing unit 402 may receive signals via a plug connection 404 and a ground plug connection 406 and may determine a coupling orientation of the plug. In one embodiment, the sensing unit 402 detects a signal between the plug connection 404 and the ground plug connection 406. In response to detecting the signal, the sensing unit 402 may indicate the coupling orientation of the plug. For example, a first position may indicate a first coupling orientation. The sensing unit 402 may transmit a coupling orientation indication via an indication connection 408. The indication connection 408 may be coupled to a signal polarity unit. In one embodiment, the sensing unit 402 may transmit the coupling orientation indication to a logic unit (not shown). The logic unit may control the signal polarity unit to select the signal polarity. The logic unit may be implemented using a processing unit, a digital signal processor (DSP), a field-programmable gate array (FPGA), etc.

The sensing unit 402 may include a diode 410 and an opto-coupling element 412. The diode 410 may form a clipping circuit that removes a part of a voltage between the plug connection 404 and the ground plug connection 406. The diode 410 may provide reverse voltage protection for one or more elements of the sensing unit 402, such as an LED (not shown). The opto-coupling element 412 may transmit a voltage threshold indication, indicating whether a voltage level of the signal between the plug connection 404 and the ground plug connection 406 is greater than a voltage threshold. The sensing unit 402 may determine the coupling orientation based at least in part on the voltage threshold indication from the opto-coupling element 412. If the opto-coupling element 412 determines that the voltage level is greater than the voltage threshold, the sensing unit 402 may indicate one coupling orientation. However, if the opto-coupling element 412 determines that the voltage level is not greater than the voltage threshold, the sensing unit 402 may indicate a different coupling orientation.

In one embodiment, the opto-coupling element 412 may determine a current level of the signal between the plug connection 404 and the ground plug connection 406. The opto-coupling element 412 may include a resistor (not shown) in series with the LED that determine the current level of the signal. The opto-coupling element 412 may transmit a current threshold indication, indicating whether the current level of the signal is greater than a current threshold. If the opto-coupling element 412 determines that the current level is greater than the current threshold, the sensing unit 402 may indicate one coupling orientation. However, if the opto-coupling element 412 determines that the current level is not greater than the current threshold, the sensing unit 402 may indicate a different coupling orientation. The sensing unit 402 may transmit the coupling orientation indication via the indication connection 408.

Figure 5:
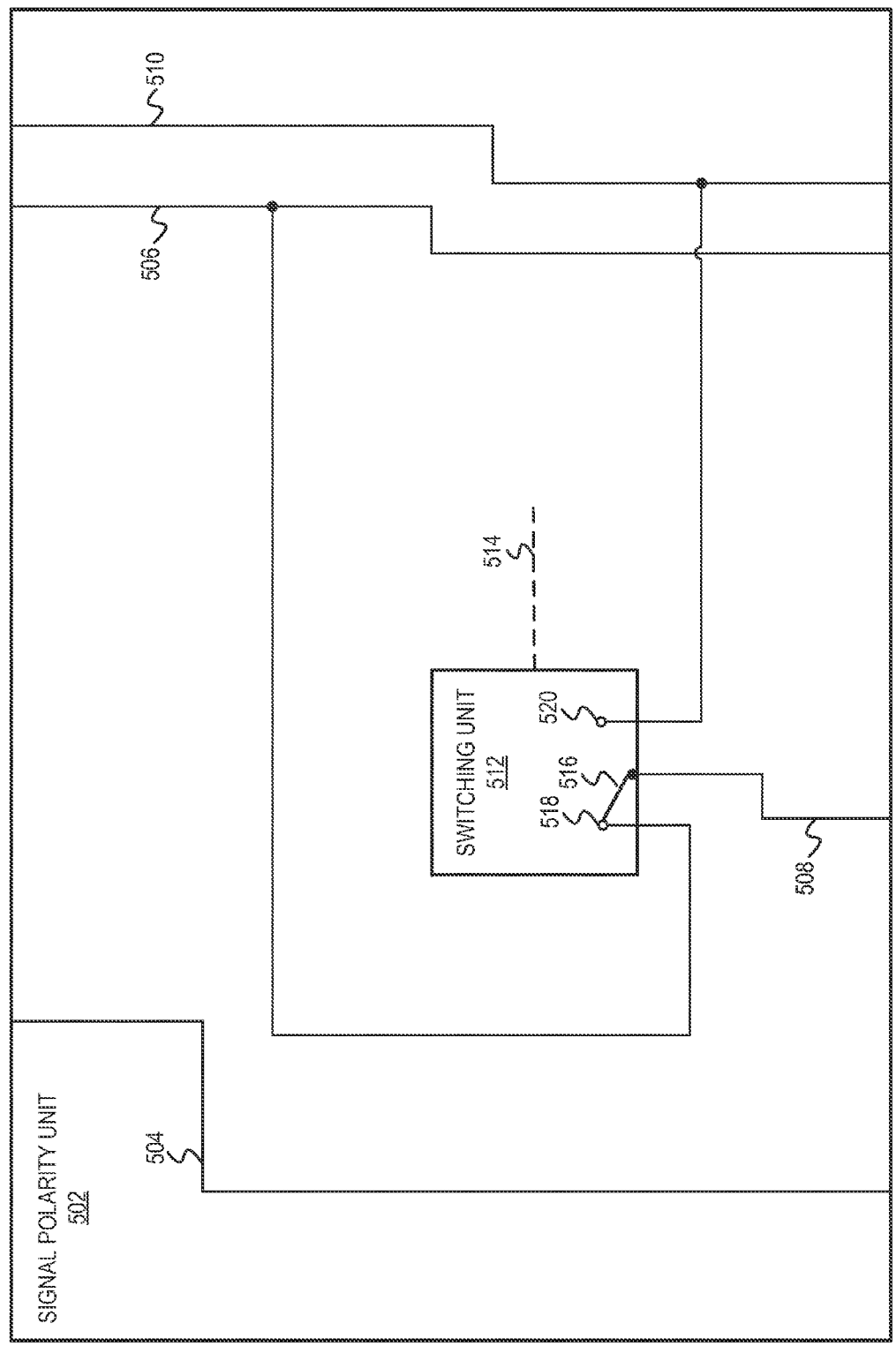
FIG. 5 is a diagram showing an example signal polarity unit of a network device.

FIG. 5 is a diagram showing an example signal polarity unit of a network device. In FIG. 5, the signal polarity unit 502 includes a ground plug connection 504, a first plug connection 506, a communication connection 508, and a second plug connection 510. The ground plug connection 504 propagates data between a plug and a communication unit. The first plug connection 506 propagates data between the plug and a switching unit 512. The communication connection 508 propagates data between the communication unit and the switching unit 512. The second plug connection 510 propagates data between the plug and the switching unit 512.

The switching unit 512 includes a switch 516 that may be in a closed position 518 or in an open position 520. The switch 516 receives an indication via an indication connection 514. Based on the indication, the switching unit 512 places the switch 516 in the closed position 518 or in the open position 520. The indication may be a signal, an instruction, etc. When the switch 516 is in the closed position 518, the switching unit 512 couples the communication connection 508 with the first plug connection 506. When the switch 516 is the open position 520, the switching unit 512 couples the communication connection 508 with the second plug connection 510.

Figure 6:
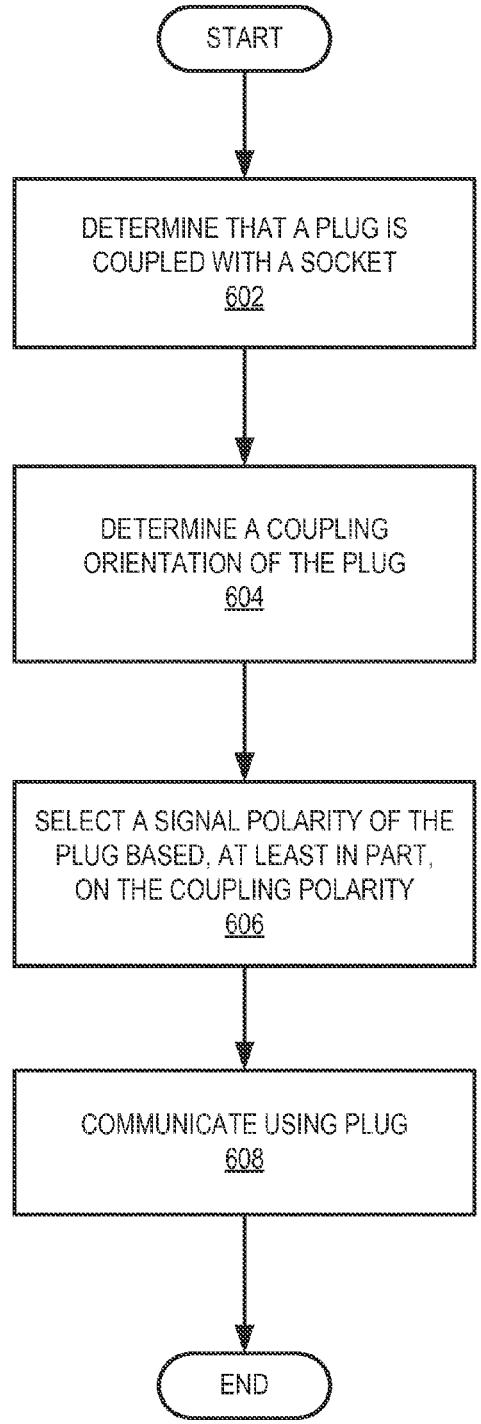
FIG. 6 is a flow diagram illustrating example operations of a network device.

FIG. 6 is a flow diagram illustrating example operations of a network device. At block 602, the network device determines that a plug is coupled to (i.e., plugged into) a socket. As described above, the plug may include four terminals, including a first plug terminal, a second plug terminal, a first ground plug terminal, and a second ground plug terminal. Similarly, the socket includes four socket terminals. The socket is coupled to a PLC network.

At block 604, the network device determines a coupling orientation of the plug. The coupling orientation indicates a position of the plug, when the plug is coupled with the socket.

At block 606, the network device selects a signal polarity of the plug based, at least in part, on the coupling orientation.

At block 608, the network device communicates using the plug. A communication unit of the network device communicates over the plug to transmit and receive data over the PLC network. The communication unit uses the line socket connection and the neutral socket connection of the network device as selected at block 606.

As will be appreciated in light of the disclosure, the flow diagrams of FIG. 6 may be modified in order to derive alternative aspects of the disclosure. Also, some operations in this aspect of the disclosure are shown in sequential order. However, certain operations may occur in a different order than shown, certain operations may be performed concurrently, certain operations may be combined with other operations, and certain operations may be absent in another aspect of the disclosure.

As will be appreciated by one skilled in the art, aspects of the present disclosure may be embodied as a system, device, method, or computer program product. Accordingly, aspects of the present disclosure may take the form of a hardware embodiment, a software embodiment (including firmware, resident software, micro-code, etc.) or an embodiment combining software and hardware aspects that may all generally be referred to herein as a "circuit," "module," "unit," or "system." Furthermore, aspects of the present disclosure may take the form of a computer program product embodied in one or more non-transitory computer-readable medium storing computer program code.

The described embodiments may be provided as a computer program product, or software, that may include a non-transitory computer-readable medium storing instructions, which may be used to program a computer system (or other electronic device(s)) to perform a process according to embodiments, whether presently described or not, since every conceivable variation is not enumerated herein. A non-transitory computer-readable medium includes any mechanism for storing or transmitting information in a form (e.g., software, processing application) readable by a machine (e.g., a computer). The non-transitory computer-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communication medium.

Computer program code for carrying out operations of the embodiments may be written in any combination of one or more programming languages, including an object oriented programming language e.g., Java, Smalltalk, C++, and procedural programming languages, e.g., the "C" programming language or similar programming languages. The program code may execute on a user's computer, as a stand-alone software package, on the user's computer and on a remote computer, and/or on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that may direct a computer, other programmable data processing apparatus, or other devices to function in a particular manner, such that the instructions stored in the non-transitory computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are executable on the computer or other programmable apparatus provide processes for implementing the functions/acts specified in the flowchart and/or block diagram block or blocks.

Figure 7:
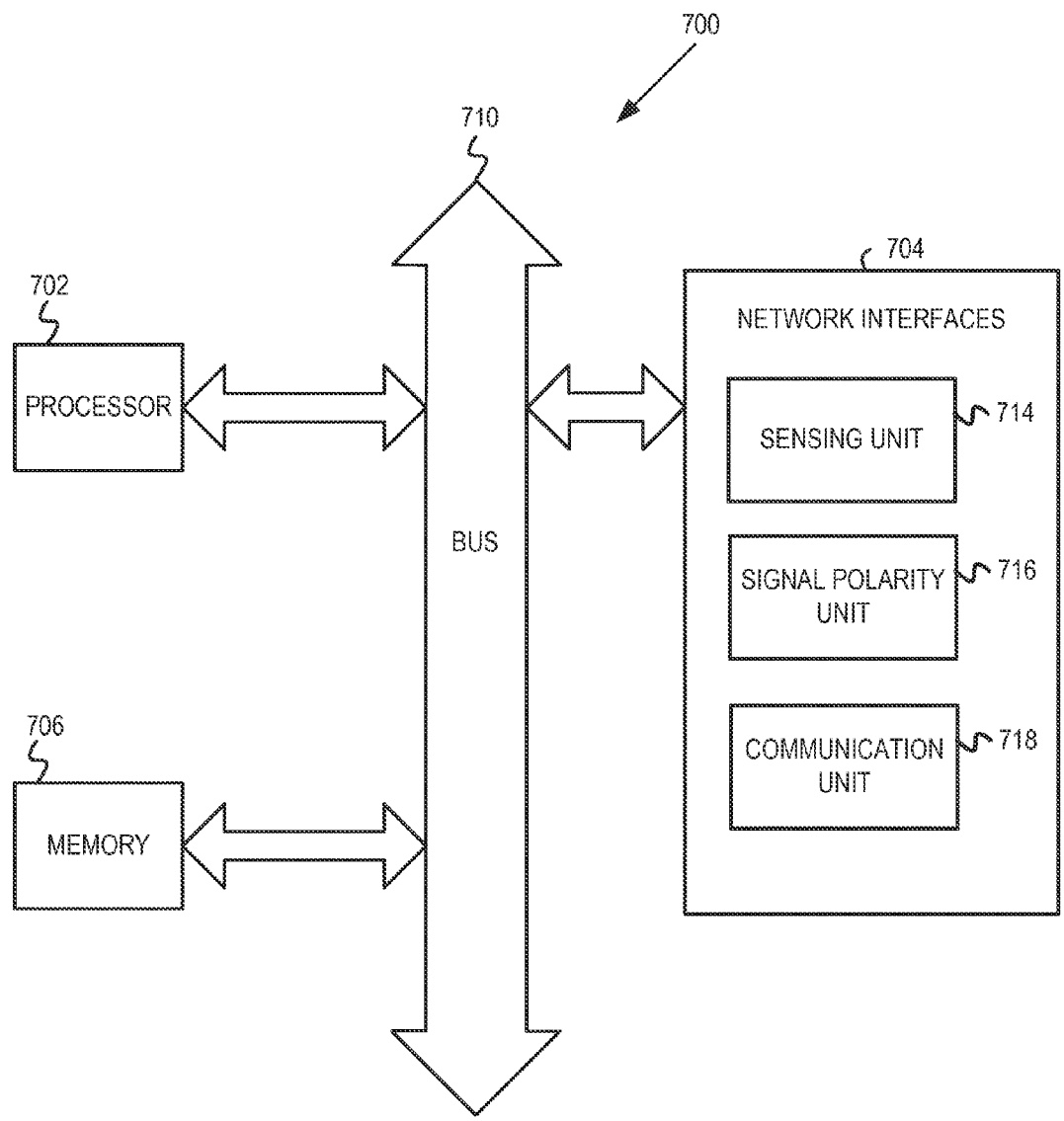
FIG. 7 is a block diagram of an embodiment of an electronic device including an interface for network communications.

FIG. 7 is a block diagram of an embodiment of a network device 700 including an interface for network communications. The network device 700 may implement the functionalities and perform the operations describe above in FIGS. 1-6. The network device 700 includes a processor 702 (including multiple processors, multiple cores, multiple nodes, and/or implementing multi-threading, etc.). The network device 700 includes memory 706. The memory 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of non-transitory machine-readable media. The network device 700 also includes a bus 710 (e.g., PCI, ISA, PCI-Express, Hyper-Transport®, InfiniBand®, NuBus, etc.). The network device 700 also includes network interfaces 704 that include at least one of a wireless network interface (e.g., a Wireless Local Area Network (WLAN) interface, a Bluetooth® interface, a WiMAX interface, a ZigBee® interface, a Wireless Universal Serial Bus (USB) interface, etc.) and a wired network interface (e.g., a PLC interface, an Ethernet interface, etc.). The network interfaces may include a sensing unit 714, a signal polarity unit 716, and/or a communication unit 718. In some embodiments, the network interfaces 704, the processor 702, and the memory 706 may implement the functionalities described above in FIGS. 1-6. For example, the network interfaces 704, the processor 702, and the memory 706 may implement the functionalities of the sensing unit 714.

The memory 706 may embody functionality to implement embodiments described above. The memory 706 may include one or more functionalities that facilitate switching a signal polarity. It is further noted that any one of these functionalities may be partially (or entirely) implemented in hardware and/or on the processor 702. For example, the functionality may be implemented with an application specific integrated circuit, in logic implemented in the processor 702, in a co-processor on a peripheral device or card, etc. Further, realizations may include fewer or additional components not illustrated in FIG. 7 (e.g., video cards, audio cards, additional network interfaces, peripheral devices, etc.). The processor 702, the memory 706, and the network interfaces 704 are coupled to the bus 710. Although illustrated as being coupled to the bus 710, the memory 706 may be coupled to the processor 702.

While the embodiments are described with reference to various implementations and exploitations, it will be understood that these embodiments are illustrative and that the scope of the subject matter is not limited to them. In general, techniques for switching a signal polarity of a plug as described herein may be implemented with facilities of hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the subject matter.

What is claimed is:

1. A method for switching a signal polarity of a plug of a network device used in a powerline communication (PLC) network, the method comprising:
   determining a coupling orientation of the plug coupled to a socket,
      wherein the plug comprises a first plug terminal, a second plug terminal, a first ground plug terminal, and a second ground plug terminal, and
      wherein the coupling orientation indicates a position of the plug with respect to the socket; and
   selecting the signal polarity for the plug based, at least in part, on the coupling orientation, wherein the signal polarity indicates which of the first plug terminal and the second plug terminal will be used to transmit data.

2. The method of claim 1, wherein
   the first plug terminal is for coupling with a line socket terminal or a neutral socket terminal of the socket, the second plug terminal is for coupling with the neutral socket terminal or the line socket terminal of the socket, the first ground plug terminal is for coupling with a first ground socket terminal or a second ground socket terminal of the socket, and the second ground plug terminal is for coupling with the second ground socket terminal or the first ground socket terminal of the socket.

3. The method of claim 1, wherein
   the first plug terminal is coupled to a first plug connection, the second plug terminal is coupled to a second plug connection, and
   the first ground plug terminal and the second ground plug terminal are both coupled to a ground plug connection.

4. The method of claim 3, wherein the determining the coupling orientation of the plug includes,
   determining whether a sensing unit detects a signal between the second plug connection and the ground plug connection, and
   in response to determining that the sensing unit detects the signal, indicating the coupling orientation.

5. The method of claim 4, wherein the determining whether the sensing unit detects the signal includes,
   determining whether an opto-coupling element indicates a voltage level between the second plug connection and the ground plug connection that is greater than a voltage threshold.

6. The method of claim 4, wherein the determining whether the sensing unit detects the signal includes,
   determining whether the sensing unit detects a current level between the second plug connection and the ground plug connection that is greater than a current threshold.

7. The method of claim 1, wherein the determining the coupling orientation of the plug includes,
   accessing a communication transmitted over the first plug terminal or the second plug terminal; and
   determining whether a signal-to-noise ratio (SNR) associated with the communication indicates an SNR level that is greater than an SNR threshold.

8. The method of claim 1, further comprising:
   switching from communicating over the PLC network using the first plug terminal to communicating over the PLC network using the second plug terminal, wherein the switching is based, at least in part, on the coupling orientation.

9. The method of claim 1, wherein
   communication over the PLC network is performed using a multiple-input multiple-output (MIMO) technique.

10. A device comprising:
    a processor; and
    a memory to store instructions, which when executed by the processor cause the device to:
    determine a coupling orientation of a plug of the device,
       wherein the plug comprises a first plug terminal, a second plug terminal, a first ground plug terminal, and a second ground plug terminal, and
       wherein the coupling orientation indicates a position of the plug with respect to a socket; and
    select a signal polarity for the plug based, at least in part, on the coupling orientation, wherein the signal polarity indicates which of the first plug terminal and the second plug terminal will transmit data.

11. The device of claim 10, wherein
    the first plug terminal is for coupling with a line socket terminal or a neutral socket terminal of the socket, the second plug terminal is for coupling with the neutral socket terminal or the line socket terminal of the socket, the first ground plug terminal is for coupling with a first ground socket terminal or a second ground socket terminal of the socket, and the second ground plug terminal is for coupling with the second ground socket terminal or the first ground socket terminal of the socket.

12. The device of claim 10, wherein
the first plug terminal is coupled to a signal polarity unit via a first plug connection,
the second plug terminal is coupled to the signal polarity unit via a second plug connection, and
the second ground plug terminal are both coupled to the signal polarity unit via a ground plug connection.

13. The device of claim 12, wherein the instructions that cause the device to determine the coupling orientation include instructions that cause the device to:
detect a signal between the second plug connection and the ground plug connection, and
in response to detection of the signal,
indicate the coupling orientation.

14. The device of claim 13, wherein the instructions that cause the device to detect the signal include instructions that cause the device to:
determine whether an opto-coupling element indicates a voltage level between the second plug connection and the ground plug connection that is greater than a voltage threshold.

15. The device of claim 13, wherein the instructions that cause the device to detect the signal include instructions that cause the device to:
detect a current level between the second plug connection and the ground plug connection that is greater than a current threshold.

16. The device of claim 10, wherein the instructions that cause the device to determine the coupling orientation of the plug include instructions that cause the device to:
access a communication transmitted over the first plug terminal or the second plug terminal; and
determine whether a signal-to-noise ratio (SNR) associated with the communication indicates an SNR level that is greater than an SNR threshold.

17. The device of claim 10, wherein the instructions that cause the device to select the signal polarity include instructions that cause the device to:
switch from communicating over a powerline communication network using the first plug terminal to communicating over the powerline communication network using the second plug terminal, wherein the switch is based, at least in part, on the coupling orientation.

18. The device of claim 10, wherein
the data is transmitted over a powerline communication network using a multiple-input multiple-output (MIMO) technique.

19. A non-transitory computer-readable medium storing computer program code, the computer program code comprising instructions executable by a processor, the instructions to:
determine a coupling orientation of a plug of a network device used in a powerline communication network,
wherein the plug comprises a first plug terminal, a second plug terminal, a first ground plug terminal, and a second ground plug terminal, and
wherein the coupling orientation indicates a position of the plug with respect to a socket; and
select a signal polarity for the plug based, at least in part, on the coupling orientation, wherein the signal polarity indicates which of the first plug terminal and the second plug terminal will be used to transmit data.

20. The non-transitory computer-readable medium storing computer program code of claim 19, wherein
the first plug terminal is for coupling with a line socket terminal or a neutral socket terminal of the socket, the second plug terminal is for coupling with the neutral socket terminal or the line socket terminal of the socket, the first ground plug terminal is for coupling with a first ground socket terminal or a second ground socket terminal of the socket, and the second ground plug terminal is for coupling with the second ground socket terminal or the first ground socket terminal of the socket.

21. The non-transitory computer-readable medium storing computer program code of claim 19, wherein
the first plug terminal is coupled to a signal polarity unit via a first plug connection,
the second plug terminal is coupled to the signal polarity unit via a second plug connection, and
the first plug terminal and the second ground plug terminal are both coupled to the signal polarity unit via a ground plug connection.

22. The non-transitory computer-readable medium storing computer program code of claim 21, wherein the instructions to determine the coupling orientation of the plug include instructions to,
detect a signal between the second plug connection and the ground plug connection; and
in response to detection of the signal, indicate the coupling orientation.

23. The non-transitory computer-readable medium storing computer program code of claim 22, wherein the instructions to detect the signal include instructions to determine whether an opto-coupling element indicates a current level between the second plug connection and the ground plug connection that is greater than a current threshold.

24. The non-transitory computer-readable medium storing computer program code of claim 22, wherein the instructions to detect the signal include instructions to detect a voltage level between the second plug connection and the ground plug connection that is greater than a voltage threshold.

25. The non-transitory computer-readable medium storing computer program code of claim 21, wherein the instructions to determine the coupling orientation of the plug include instructions to,
access a communication transmitted over the first plug terminal or the second plug terminal; and
determine whether a signal-to-noise ratio (SNR) associated with the communication indicates an SNR level that is greater than an SNR threshold.

26. The non-transitory computer-readable medium storing computer program code of claim 21, wherein the instructions to select the signal polarity include instructions to,
switch from using the first plug terminal to using the second plug terminal based, at least in part, on the coupling orientation.

27. The non-transitory computer-readable medium storing computer program code of claim 19, wherein
communication over the powerline communication network is performed using a multiple-input multiple-output (MIMO) technique.

* * * * *